United States Patent [19]

Daggett

[11] Patent Number: 4,894,598
[45] Date of Patent: Jan. 16, 1990

[54] DIGITAL ROBOT CONTROL HAVING AN IMPROVED PULSE WIDTH MODULATOR

[75] Inventor: Kenneth E. Daggett, Murrysville, Pa.

[73] Assignee: Staubli International AG, Switzerland

[21] Appl. No.: 231,627

[22] Filed: Aug. 5, 1988

Related U.S. Application Data

[63] Continuation of Ser. No. 932,841, Nov. 20, 1986, abandoned.

[51] Int. Cl.⁴ .............................................. G05B 19/42
[52] U.S. Cl. ............................ 318/568.16; 318/599; 318/563; 318/567; 364/513; 901/23; 901/24
[58] Field of Search ............................ 318/310–345, 318/562–577, 434, 599; 364/513; 901/20, 21, 22, 23, 24

[56] References Cited

U.S. PATENT DOCUMENTS

| | | | |
|---|---|---|---|
| 3,686,557 | 8/1972 | Futamura | 318/599 |
| 3,713,011 | 1/1973 | Johnson et al. | |
| 4,020,361 | 4/1977 | Suelzle et al. | 318/599 X |
| 4,076,999 | 2/1978 | Edwards et al. | 318/565 X |
| 4,099,109 | 7/1978 | Abbondanti | 318/811 |
| 4,216,419 | 8/1980 | van Dam et al. | 318/318 X |
| 4,272,712 | 6/1981 | Beling et al. | 318/318 X |
| 4,286,222 | 8/1981 | Caputo. | |
| 4,286,315 | 8/1981 | Johnson. | |
| 4,307,793 | 12/1981 | Caputo. | |
| 4,386,302 | 5/1983 | Iwasawa | 318/328 X |
| 4,481,589 | 11/1984 | McGowan et al. | 318/563 X |
| 4,514,666 | 4/1985 | Suzuki | 318/563 X |
| 4,523,134 | 6/1985 | Kinoshita et al. | 318/327 X |
| 4,578,746 | 3/1986 | Gyugyi et al. | |
| 4,599,545 | 7/1986 | Moriki et al. | 318/326 X |
| 4,631,462 | 12/1986 | Geren | 318/318 |
| 4,638,588 | 7/1977 | Woolfson et al. | 318/599 X |
| 4,651,269 | 3/1987 | Matsumura | 318/599 X |
| 4,673,859 | 6/1987 | Shero et al. | |
| 4,682,089 | 7/1987 | Tamari | 318/565 X |
| 4,684,437 | 8/1987 | Langley et al. | 318/254 |
| 4,763,054 | 8/1988 | Bundy | 318/341 X |
| 4,782,272 | 11/1988 | Buckley et al. | 318/599 X |

Primary Examiner—William M. Shoop, Jr.
Assistant Examiner—Paul Ip
Attorney, Agent, or Firm—Mason, Kolehmainen, Rathburn & Wyss

[57] ABSTRACT

A pulse width moduation (PWM) scheme provides for digital implementation of robot control commands. For this purpose, it provides time stabilized current sampling synchronized to the sampling frequency of the position and velocity loops in the robot control. The PWM scheme enables accurate motor current measurement through usage of a single current sense resistor independent of the number of legs in a power amplifier configuration. This scheme permits commercially available, low cost, power blocks to be used for implementation of robot control system power amplifiers.

The PWM scheme is cost effectively implemented in a semi-custom large scale integrated (LSI) circuit which provides the digital interface between a torque loop microprocessor and the drive circuitry for the power handling devices used to apply voltage to the robot axis actuator. Interface and control for three axes is provided by a single LSI device.

24 Claims, 16 Drawing Sheets

PWM DEVICE REGISTER MAP

| A2 | A1 | A0 | REGISTER | FUNCTION |
|----|----|----|----------|----------|
| 0 | 0 | 0 | R0 | RAMP COUNTER (READ ONLY) |
| 0 | 0 | 1 | R1 | COMMAND\STATUS |
| 0 | 1 | 0 | R2 | AXIS 1 LEAST SIGNIFICANT BIT |
| 0 | 1 | 1 | R3 | AXIS 1 MOST SIGNIFICANT 8-BITS |
| 1 | 0 | 0 | R4 | AXIS 2 LEAST SIGNIFICANT BIT |
| 1 | 0 | 1 | R5 | AXIS 2 MOST SIGNIFICANT 8-BITS |
| 1 | 1 | 0 | R6 | AXIS 3 LEAST SIGNIFICANT BIT |
| 1 | 1 | 1 | R7 | AXIS 3 MOST SIGNIFICANT 8-BITS |

REGISTER R1 BIT FUNCTIONS

REGISTER R1 BIT FUNCTIONS

DIGITAL ROBOT CONTROL HAVING AN IMPROVED PULSE WIDTH MODULATOR

This application is a continuation of application Ser. No. 06/932,841 filed Nov. 20, 1986, now abandoned.

CROSS REFERENCE TO RELATED APPLICATIONS

The following concurrently filed patent applications, each filed on Nov. 20, 1986, are related to the disclosure of the present application, assigned to the present assignee and are hereby incorporated by reference:

U.S. Ser. No. 932,975, now Continuation Ser. No. 180,719 filed Apr. 4, 1988 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,992 entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 now Continuation Ser. No. 178,813 filed Apr. 1, 1988 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 now continuation Ser. No. 178,811 filed Apr. 1, 1988 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977, now Continuation Ser. No. 180,601 filed Apr. 6, 1988 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990, now Continuation Ser. No. 180,723 filed Apr. 4, 1988 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Pat. No. 4,829,219 entitlted MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 entitled MULTIAXIS ROBOT CONTROL HAVING CAPABILITY FOR EXECUTING TIMED MOVES and filed by Rajan Penkar.

U.S. Pat. No. 4,772,831 entitled MULTIAXIS ROBOT CONTROL HAVING IMPROVED CONTINUOUS PATH OPERATION and filed by Rajan Penkar.

U.S. Pat. No. 4,773,025 entitled MULTIAXIS ROBOT CONTROL HAVING FITTED CURVED PATH CONTROL and filed by Rajan Penkar.

U.S. Ser. No. 932,973, now Continuation Ser. No. 180,598 filed Apr. 6, 1988 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robot controls and more particularly to pulse width modulators employable in digital robot controls to generate control signals for operating the power amplifiers and robot joint motors and thereby controlling the robot arm motion and positioning.

In the incorporated cross-referenced patent applications, there is disclosed a new completely digital robot control which provides advanced robot performance with high accuracy, high speed, high reliability and economy of manufacture.

The design of robot controls has been partly based on what has been learned from the design of numerical machine tool controls. In a typical machine tool control, a position control loop may be implemented in a microprocessor or other digital controller which generates an analog voltage representing a velocity setpoint for a power amplifier assembly. Servo control loops for velocity and torque are closed with analog circuitry located within the power amplifier assembly.

In more recent robot controls, both position and velocity control loops have been implemented in a microprocessor or other digital controller which generates a voltage output representing velocity error or current setpoint for the power amplifier assembly. Analog circuitry in the power amplifier closes the current loop.

Requirements placed on robot control systems differ significantly from those placed on numerical machine tool controls. The following are two basic differences:

1. Control loop parameters can typically be established to optimize control at the time of machine tool installation because time constants for the system are relatively constant for all operating conditions of the machine. Robot control parameters cannot be similarly fixed since robot time constants can vary significantly over the operating range of the robot arm due to large inertia changes caused by the manipulation of variable weight loads from fully collapsed to fully extended arm positions.

2. Machine tools typically required stiff accurate path control. Robot arms typically require dexterity which in turn is facilitated by control over the force applied by the robot arm to an object.

With a completely digital control configuration, special robot control needs can be more readily and more effectively met. In developing the digit robot control disclosed in the incorporated cross-referenced patent applications, it became necessary to conceive and employ a pulse width modulation (PWM) scheme which enables digital implementation of the current loop outside the power amplifier block, i.e., with (1) digital signals applied directly to the power amplifier to control directly switch condition time and (2) time stabilized motor current feedback sampling synchronized to the sampling frequency of the position and velocity loops.

The present invention is directed to such a PWM scheme and to a device for implementing the PWM scheme.

SUMMARY OF THE INVENTION

A digital pulse width modulator circuit is provided for operating power amplifiers and joint motors in a robot control. The modulator employs an up/down counter means for generating a sawtooth waveform as a function of time. The counter means count is compared to a signal representing a control command so as to define the time span needed to operate a power amplifier and energize an associated joint drive motor in accordance with the control command.

A first output control pulse is generated for power amplifier switching when one drive polarity is commanded. The first output control pulse has a width corresponding to the defined time span and it is based on a count comparison referenced to the upper endpoint of the sawtooth waveform.

A second output control pulse is generated for power amplifier switching when the other polarity is commanded. The second output control pulse has a width corresponding to the defined time span and it is based on a count comparison referenced to the lower endpoint of the sawtooth waveform.

DESCRIPTION OF THE PREFERRED EMBODIMENT

ROBOTS—GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
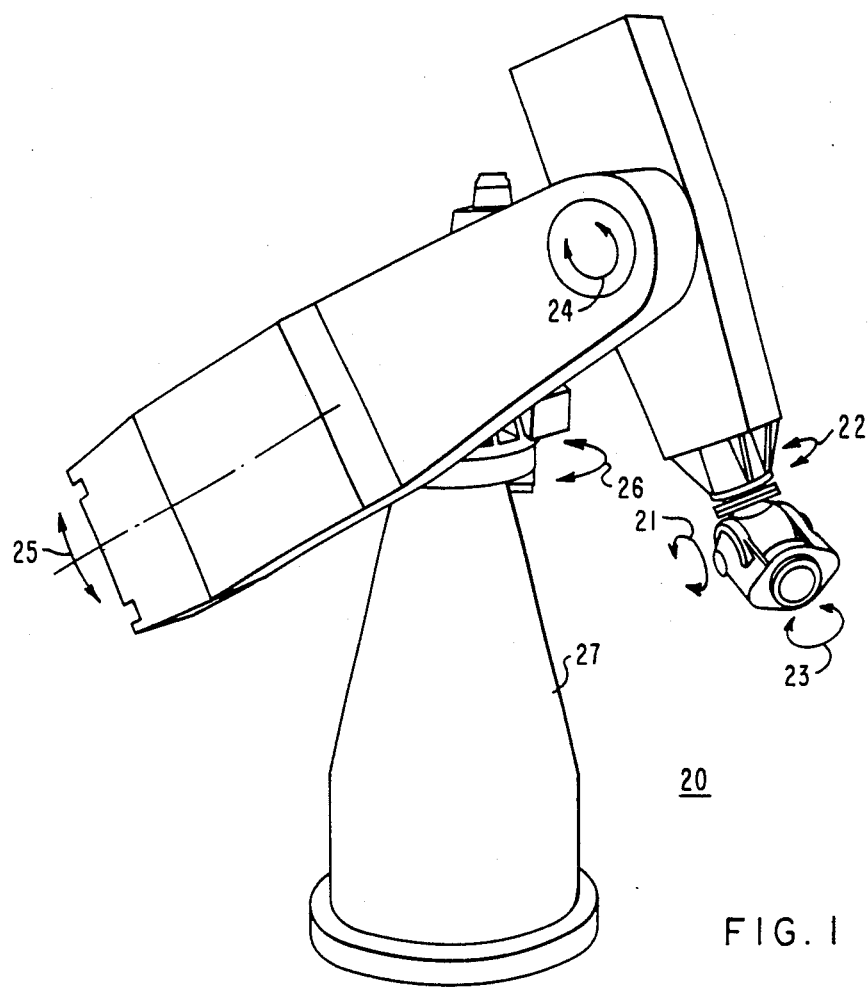
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robot to service multiple machines and work surfaces.

Each axis motion is generated by a brush type DC electric motor, with axis position feedback generated by incremental encoders. As shown, the robot wrist is provided with three articulations, i.e. an up/down rotation indicated by arrow 21, a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIGS. 2, 3 or 4) which can operate the robot 20 of FIG. 1 and other Unimation robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
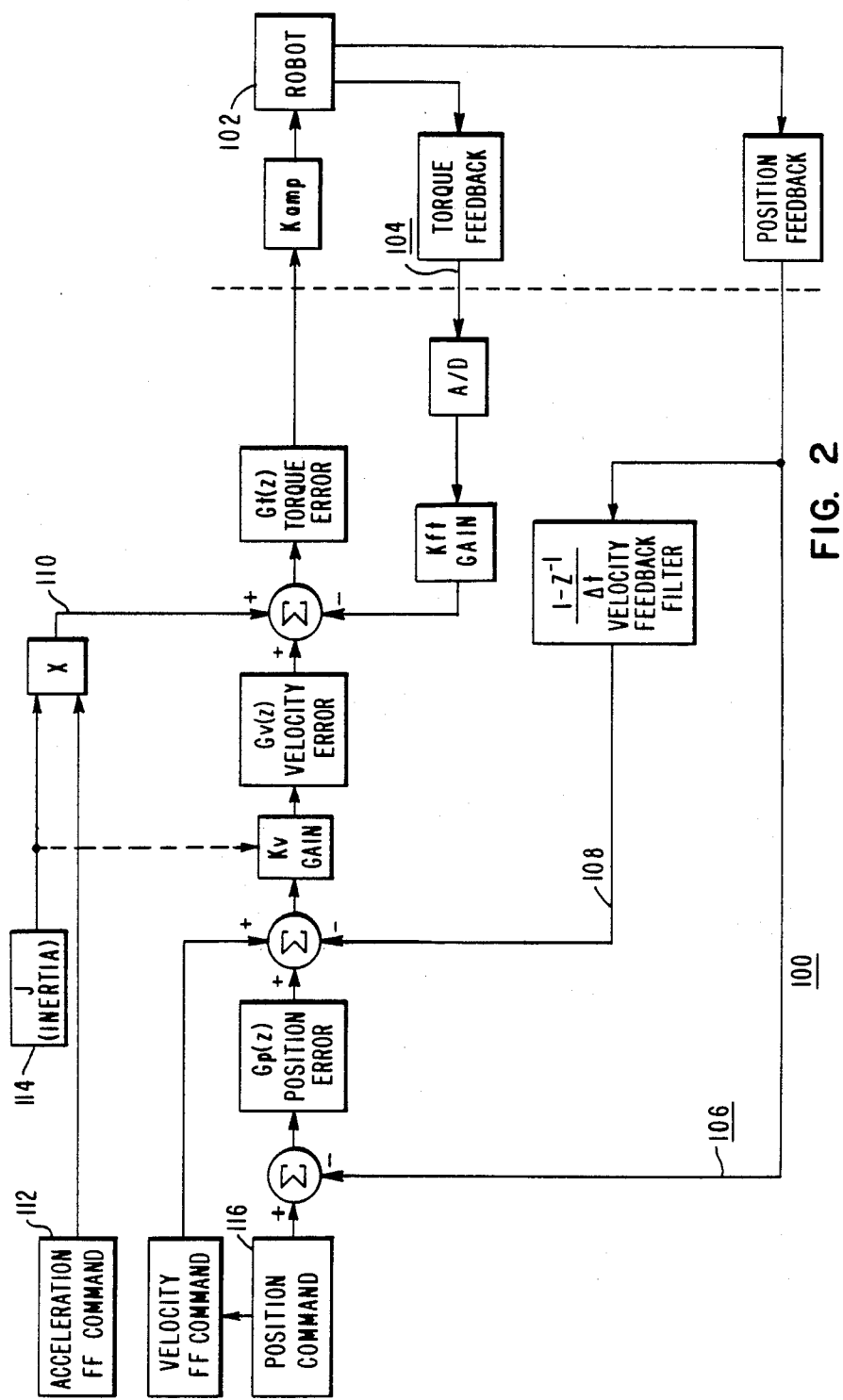
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
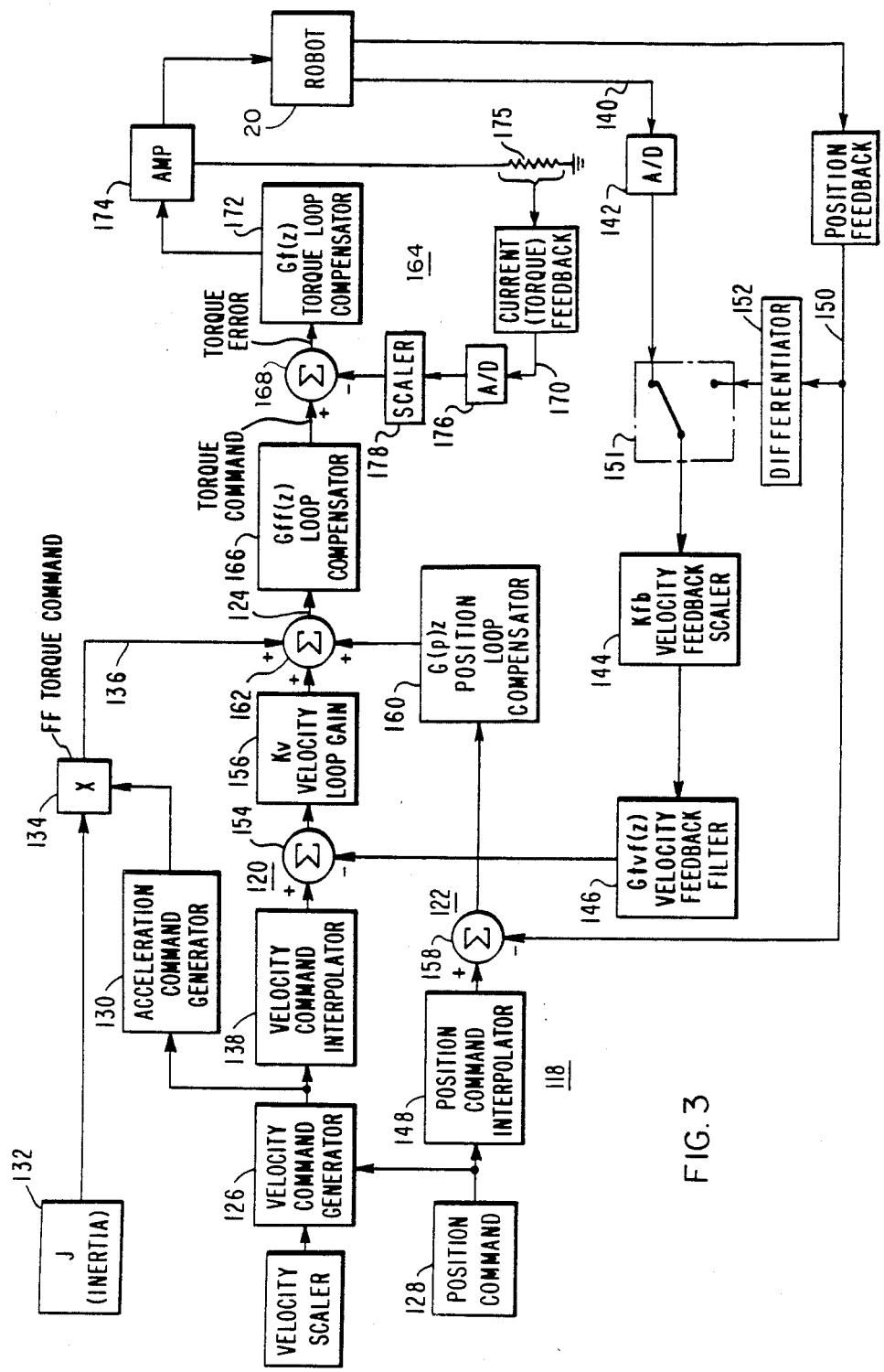
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL TM robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loops 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced application U.S. Ser. No. 932,853.

Velocity error is generated by summer 154 with gain applied by loop 156. Similary, position error is generated by summer 158 with gain applied by box 160.

Velocity and position errors and feedforward acceleration command are summed in summer 162. Gain is applied to box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error to get (motor voltage commands) and pulse width modulated (PWM) output signals are applied to a power amplifier 174 which supplies the motor drive current for robot joint operation. Current feedback from resistor 175 is sampled every 250 microseconds (see referenced patent application Ser. No. 180,719) and converted to digital signals by box 176 with scaling applied by box 178.

BOARD OVERVIEW

Figure 4:
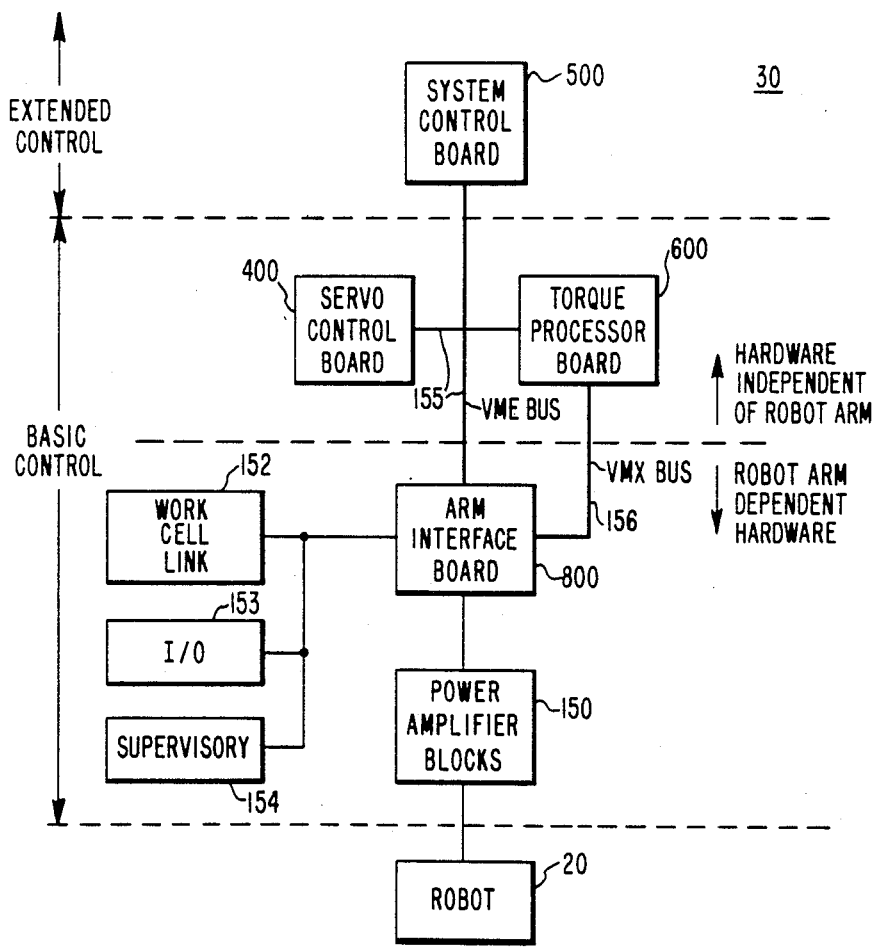
FIG. 4 shows an overview of an arrangement of electronic boards on which circuitry is arranged to implement the robot control system including the pulse width modulation circuitry of the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facility and universality of use, and flexibility in choice of level of control performance.

As shown in FIG. 4, the control board configuration or network includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) 800 board also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL TM robot control can operate the robot 20 with significantly faster control action, i.e., with a trajectory cycle shortened from thirty-two microseconds to eight microseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

ARM DRIVE CONTROL

Figure 6A:
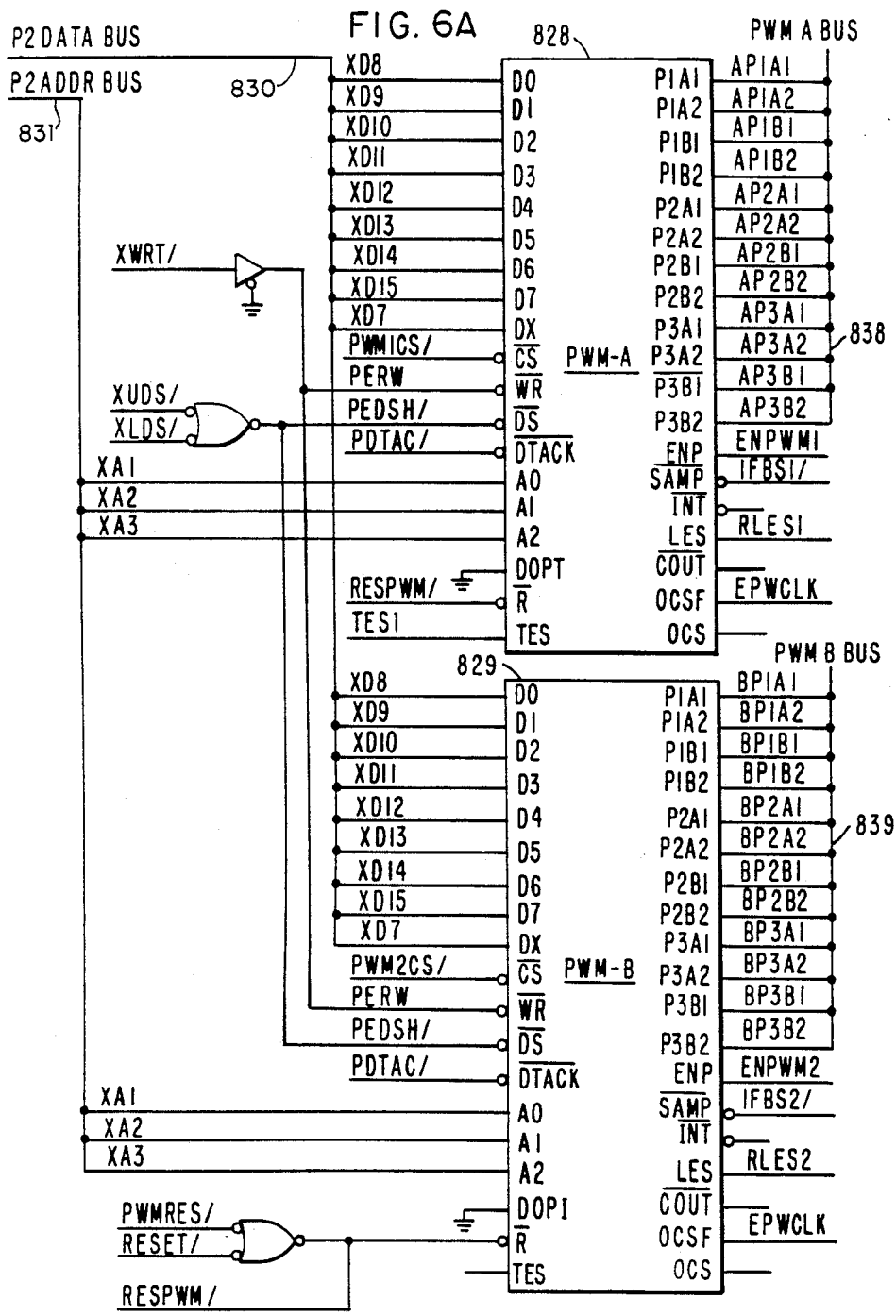
FIGS. 6A and 6B show circuitry employed on the arm interface board to couple joint motor voltage commands to the PWM generator which is formed by a pair of LSI chips.

As previously described, the higher level control looping generates voltage command signals to be executed through the AIF board 800 for the arm axes so that the arm effector is moved to commanded positions under controlled velocity, acceleration and torque in accordance with a user's robot program. Pulse width modulation circuitry 801 in FIG. 6A and drive circuitry 802 in FIG. 7C are provided on the AIF board 800 to develop axis drive signals, in this instance for application to power amplifiers which provide the drive currents to DC brushless electric motors respectively associated with the six axes of arm motion. With the employment of pulse width modulated digital control signals, the solid state switches that control the motor currents within the power amplifiers can be operated much more efficiently to control motor current levels through pulsating on/off control as opposed to continuous amplitude control.

PULSE WIDTH MODULATION SCHEME

General Overview

The pulse width modulation circuitry provides a digital interface for closing the torque or current control loop through the axis motor drive circuitry. The pulse width modulation concept is applied to control the conduction time width for the joint motor power switches and thereby satisfy motor voltage and torque and other higher level commands.

Figure 5A:
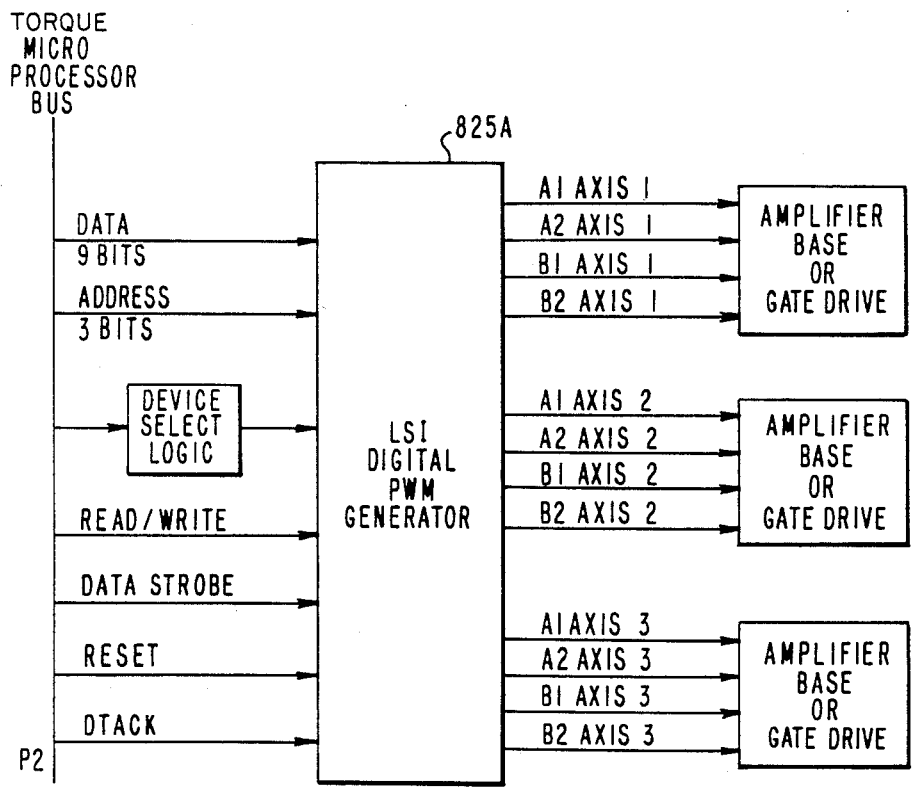
FIG. 5A shows a block diagram of a pulse width modulation (PWM) generator which produces control signals for a power amplitifer in accordance with the principles of the invention.

As shown in the generalized block diagram of FIG. 5A, a digital PWM generator 825A receives 9 bit data commands and 3 register address bits on the torque microprocessor P2 bus (specifically shown elsewhere as VMX bus 156. Additionally, device select logic, read/-write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type.

Four digital PWM signals control the direction and magnitude of current flow through the motor windings through on/off power switch control. In the brushless DC motor embodiment, the three phase windings of the brushless DC motor are interconnected in a bridge circuit (FIG. 9B) such that the motor drive current is always directed through a pair of windings and the motor conduction path is rotated or commutated through successive winding pairs to produce the motor drive torque. In this arrangement, the PWM pulses determine the time span of motor current flow and commutation switching logic based on the PWM pulses and Hall effect sensor feedback signals determine the winding pairs through which, and the direction in which, drive current is to flow.

In the DC brush type embodiment where an H type power amplifier bridge circuit is employed, DC brush type motor 54 (FIG. 10) is operated in one direction when power amplifier switches (such as Bi-Polar or MOSFET semiconductor switches) 51-A1 and 51-B2 are opened under control of PWM output signals A1 and B2, when converted to driver signals 56-A1 and 56-B2, and it is operated in the opposite direction when power amplifier switches 51-B1 and 51-A2 are opened under control of PWM output signals B1 and A2, when converted to driver signals 56-B1 and 56-A2.

The three address signals generally are encoded to address eight registers within the PWm generator 825A. Two registers are used to store voltage commands for each axis. A total of six registers are thus used to store voltage commands, and the remaining two registers store command and status data common to the three axes.

PWM-Greater Detail

Figure 6B:
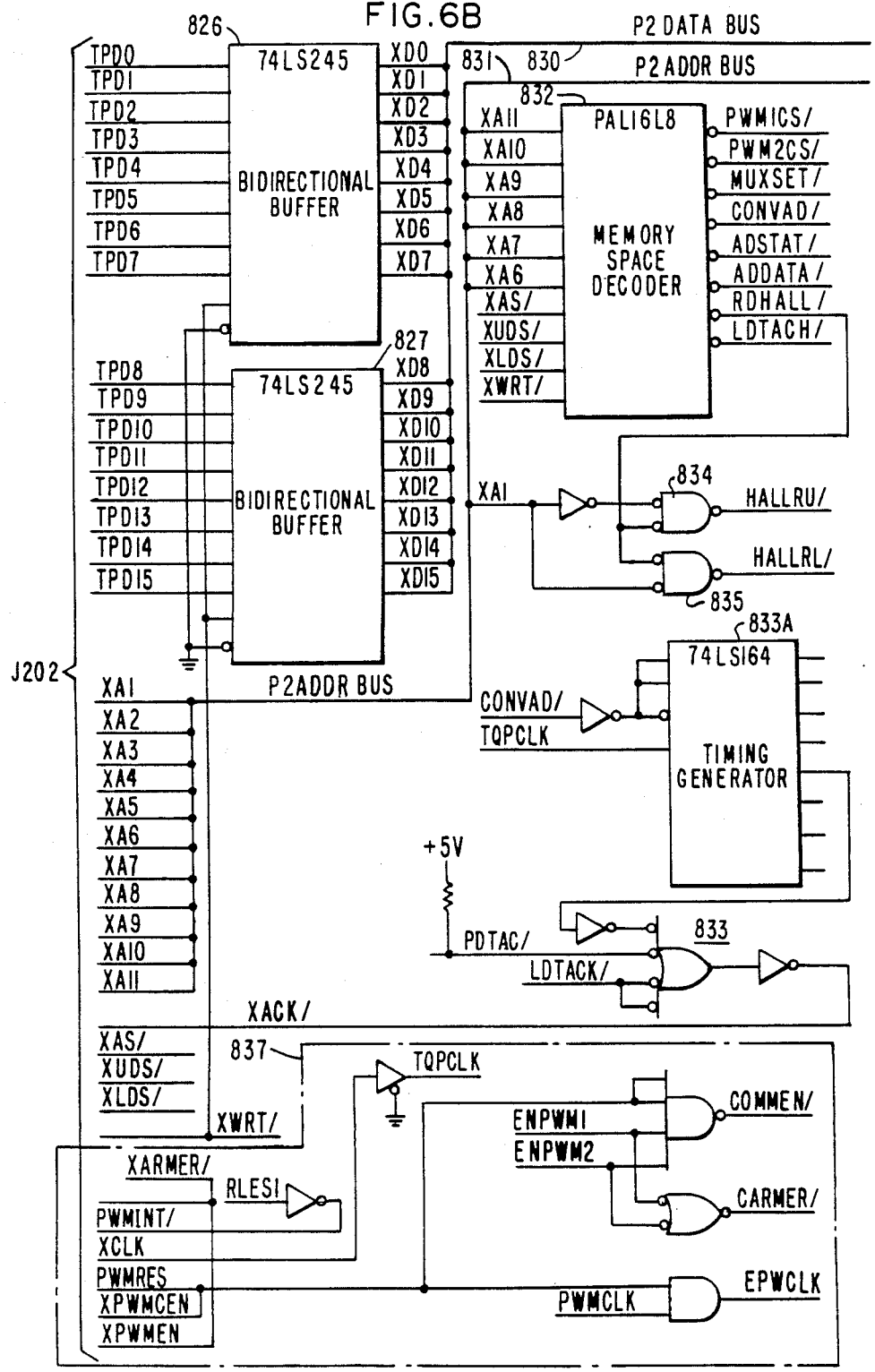

As shown in FIG. 6B, axis voltage command signals from the torque processor board 600 are recieved on the arm interface board 800 by a pair of bidirectional buffers 826 and 827. Circuitry on the AIF board 800 processes the voltage command data to develop digital TTL logic level signals to control the base or gate drive circuitry of the power amplifiers which supply the motor drive currents to the axis motors. As previously indicated, the motor currents and axis position and velocity data are fed back through the AIF board 800 to the higher level control loops for closed loop position, velocity and torque control.

The pulse width modulation circuitry is preferably embodied in pair of LSI pulse width modulation (PWM) chips 828 and 829 shown in FIG. 6A. Generally, the PWM chips 828 and 829 are specially designed from a Large Scale Integrated (LSI) gate array chip in which a multitude of isolated transistors are formed by a silicon mask deposit within a semiconductor wafer. In this case, circuitry is specifically implemented in a CMOS 3 micron, single metal, 1500 gate, gate array chip.

The desired circuit design is produced on the PWM chip by disposing a customizing metal maks on the chip to inftterconnect the transistor gates in a predetermined pattern which produces the desired circuitry.

Generally, the PWM chip operates as a microprocessor peripheral device (i.e., under the control of a microprocessor higher in the control loop configuration) to provide digital pulse width modulated signal generation for control of three axes having DC brush type motor drives. Among other embodiments, the PWM chip can be used with additional processing circuitry to provide PWM signal generation for three axes having DC brushless type motor drives.

Other general operating features include a diagnostic mode of operation which allows PWM ramp generation to be verified under microprocessor control without generation of output control signals. With respect to safety, a watchdog function disables PWM generation unless axis voltage commands are updated by the torque board microprocessor within three PWM cycles. Software controls are used to enable and disable PWM generation, and programmed voltage limits independently prevent axis voltage commands from exceeding predefined programmed values.

A ramp generated internally by the PWM chip for the purpose of controlling output pulse width has a ramp frequency which can be controlled by an internal oscillator or by an external clock. Further, the PWM chip generates an interrupt signal synchronized to current feedback sampling and a current feedback sampling pulse synchronized to the PWM ramp.

With reference to FIG. 6A, voltage command data is transferred to registers within the PWM chips 828 and 829 over a data bus 830. Command data for axes 1, 2 and 3 is sent to the PWM chip 828; command data for axes 4, 5 and 6 is sent to the PWM chip 829.

Address and control signals from the torque control manager, which is one of the microprocessors located on the torque processor board 600 in FIG. 4, are coupled to an AIF address bus 831 (FIG. 6B). A memory space decoder 832 responds to input signals and generates PWM select signals PWM1CS or PWM2CS which is applied to the PWM chip 828 or 829. It also generates MUXSET and CONVAD for analog to digital conversion control in the current feed-back path, ADSTAT and ADDATA and RDHALL for data read control and LDTACK for data signal reception acknowledgements to a torque manager on the TP board 600 through gate control circuitry 833. A timing generator 833A delays for a predetermined time period the generation of the acknowledge signal. Within PWM chip 828 or 829, address signals XA1, XA2 and XA3 route each voltage command data signal from the data bus 830 to an internal axis command data register corresponding to the axis to which the command signals applies.

In the brushless DC motor embodiment of the invention, Hall effect sensors are disposed about the drive motor stator periphery to generate magnetic rotor position signals for use in commutation switching control. A total of nine sensors are employed for each of the six axis motors.

Safety/error control circuitry 837 responds to torque board reset signals PWMRES to provide PWM reset independently of other control reset signals so as to assure that the PWM output is not started until everything else in the system is initialized. In addition, PWM reset allows direct PWM shutdown for drive or other error without requiring that other parts of the control system be shut down. XARMER represents an error condition in which the two PWM chips are determined to be out of synchronization.

Three sets of output drive control signals from the PWM chip 828 are applied to a bus 838 called PWM A BUS (FIG. 7A) for the three corresponding motor axes. Similarly, the output control signals from the PWM chip 829 are applied to a bus 839 called a PWM B BUS (FIG. 7C) for the other three corresponding motor axes.

The output signal TES1 from the PWM chip 838 is a clock signal which is divided elsewhere on the AIF board to become the synchronizing signal VTICK for the higher lever control loops.

Figure 5B:
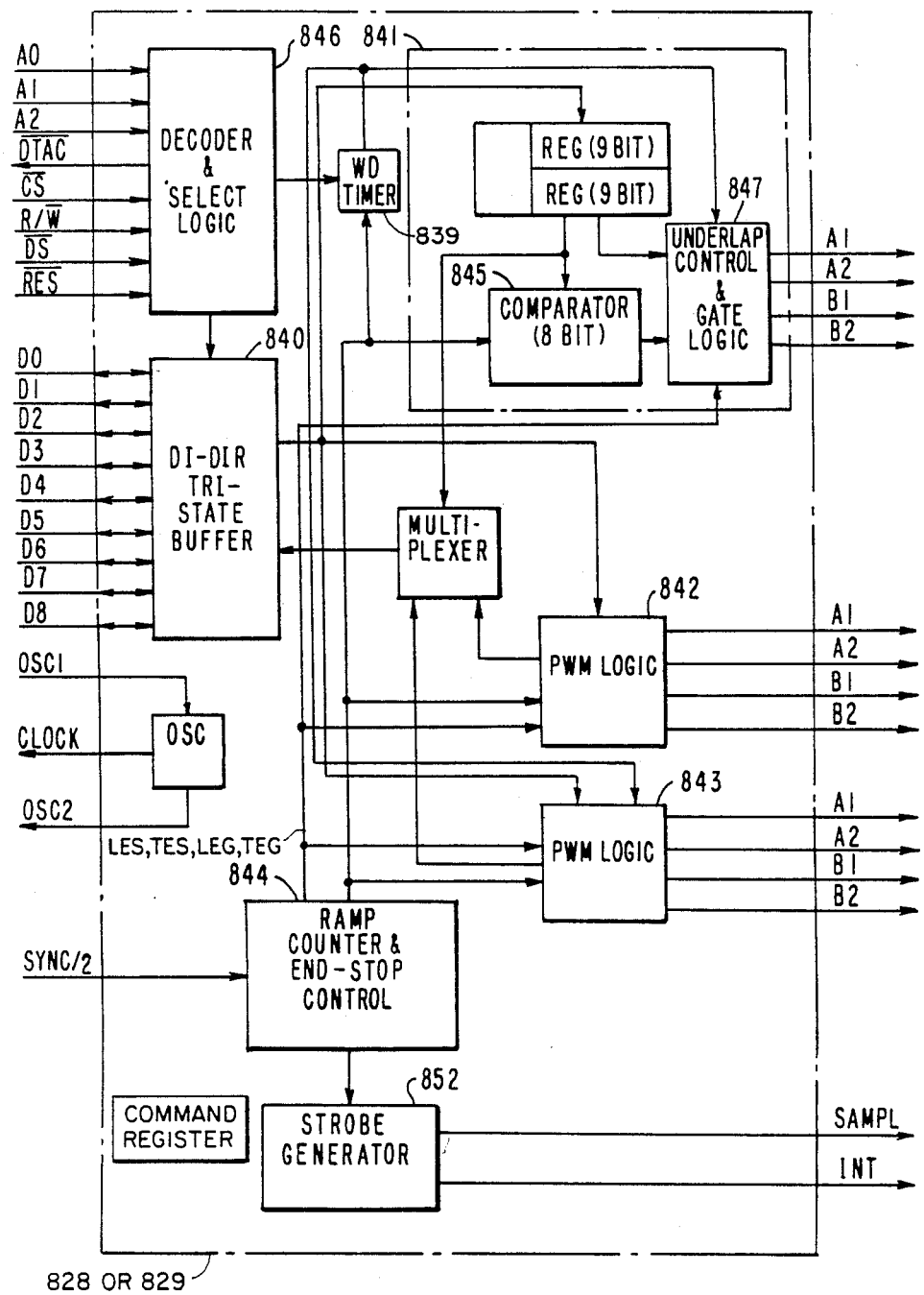
FIG. 5B shows a more detailed block diagram of the PWM generator.

A more detailed schematic diagram of the circuitry within the PWM chip is shown in FIG. 5B. The axis drive voltage commands are nine bit words in twos complement form and are stored in a tri-state bidirectional buffer 840 when received from the torque board. Decoder and select logic 846 controls data movement into and out of the buffer 840 in accordance with control signals from the torque control manager which is one of the microprocessors located on the torque processor board 600.

The control signals include a device select signal CS, a read/write signal R/W, a data strobe signal DS, and a reset or initialization signal RES. In addition, three register address signals A0, A1, A2 are encoded to address any of eight registers within the PWM chip 838 or 839.

The data bus interface includes drives and inverters which ensure that data bus hold time requirements are met for operation with a 10 MHz 68000 processor. The outputs of the inverters provide the source for an internal input data bus which provides connection to all internal registers with write capability. An internal output data bus provides the source of data for the device output data bus tri-state drivers. Each register with read operation capability is interfaced to the internal output data bus through tri-state drivers.

Three like command channels are embodied within the PWM chip 838 or 839. The channels include respective phase generators 841, 842 and 843 which produce the output power amplifier drive signals in representation of the respective voltage commands for the respective axes. In other words, the PWM output drive signals for each axis are digital signals which are timed to turn on and off such that the power amplifier for that axis produces motor drive current in correspondence to the axis voltage command.

Two registers are employed as a double buffered hold register within each command channel to store the current voltage command for that channel. Double buffering enables validation of command data.

A total of six registers are thus used for holding voltage commands in the three command channels. The other two registers within the PWM chip 828 or 829 are used to store command and status information common to all three command channels.

Figure 11:
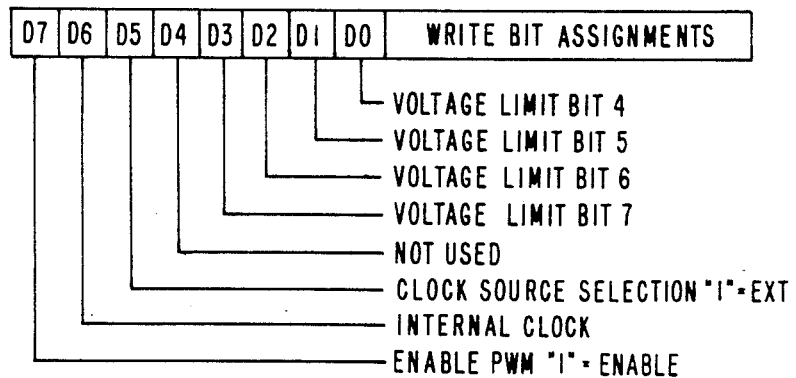
FIG. 11 shows a register map for the PWM device.
Figure 11:
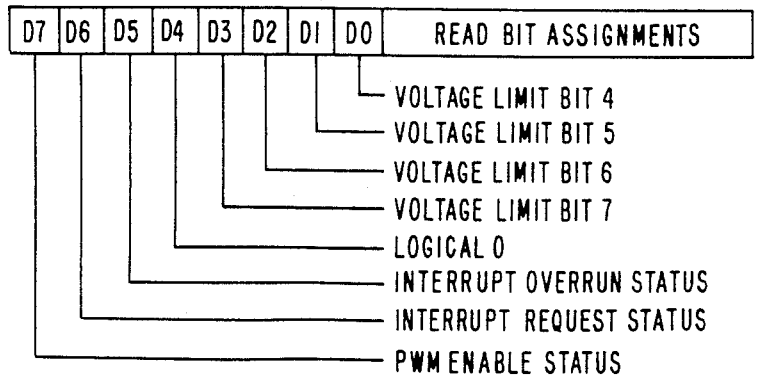

A PWM register map is shown in FIG. 11. As illustrated in the device register map, two registers are associated with latching the voltage request for each axis. One of the registers provides storage for the most significant 8-bits of voltage request, and the other register provides storage for the least significant bit of the voltage request for the axis. Selection of the 9-bit data bus configura forces the least significant bit register to be addressed whenever the most significant data register is addressed. The DX device pin is used for interchange of data with the least significant bit register. Operation of an device with the 8-bit data bus option requires this device pin to be physically connected to the least significant bit of the data bus, i.e., data bit 0, external to the device. Operation of the device with the 9-bit data bus option requires the DX pin to be connected to the least significant bit of the data bus, i.e., data bit 7 in a typical 16-bit microprocessor environment. Selection of the 9-bit data bus option then requires all references to the voltage request registers, implemented within the device, be of the word type. Byte interchange with the voltage request registers is not supported in this mode.

An eight bit up/down ramp counter 844 generates 512 clock pulses for each complete up/down or PWM cycle. The counter frequency is one half of the external clock frequency, and it provides for synchronous operation of the ramp counter 844 and the current control loop.

To determine when the power amplifier is to be energized to supply motor drive current, the ramp counter output is coupled to a comparator 845 within the phase generator 841, 842 or 843 for the respective axes. The axis voltage command is also applied to the comparator 845, and a comparison between the voltage command and the count of the ramp counter 844 provides the basis upon which the widths of the digital output control pulses are defined to control the power amplifier switching and produce an effective motor voltage which satisfies the axis command voltage. Motor current, joint position and joint velocity feedback signals close the torque, position and velocity loops respectively as digital motor voltage control commands are cylically generated for each axis (once each 32 milliseconds).

The digital voltage command employs one bit to designate the sign of the voltage command (i.e., the motor rotation direction) and eight bits to designate the value of the voltage. Counts of the ramp counter 844 correspond to points in cycle time in the PWM cycle at which the power amplifier is switched to turn motor drive current on or off. In effect, counts along the counting ramp therefore correspond to effective motor voltage which can be compared to the command motor voltage to determine when power amplifier switching should occur to satisfy motor voltage commands.

Figure 8:
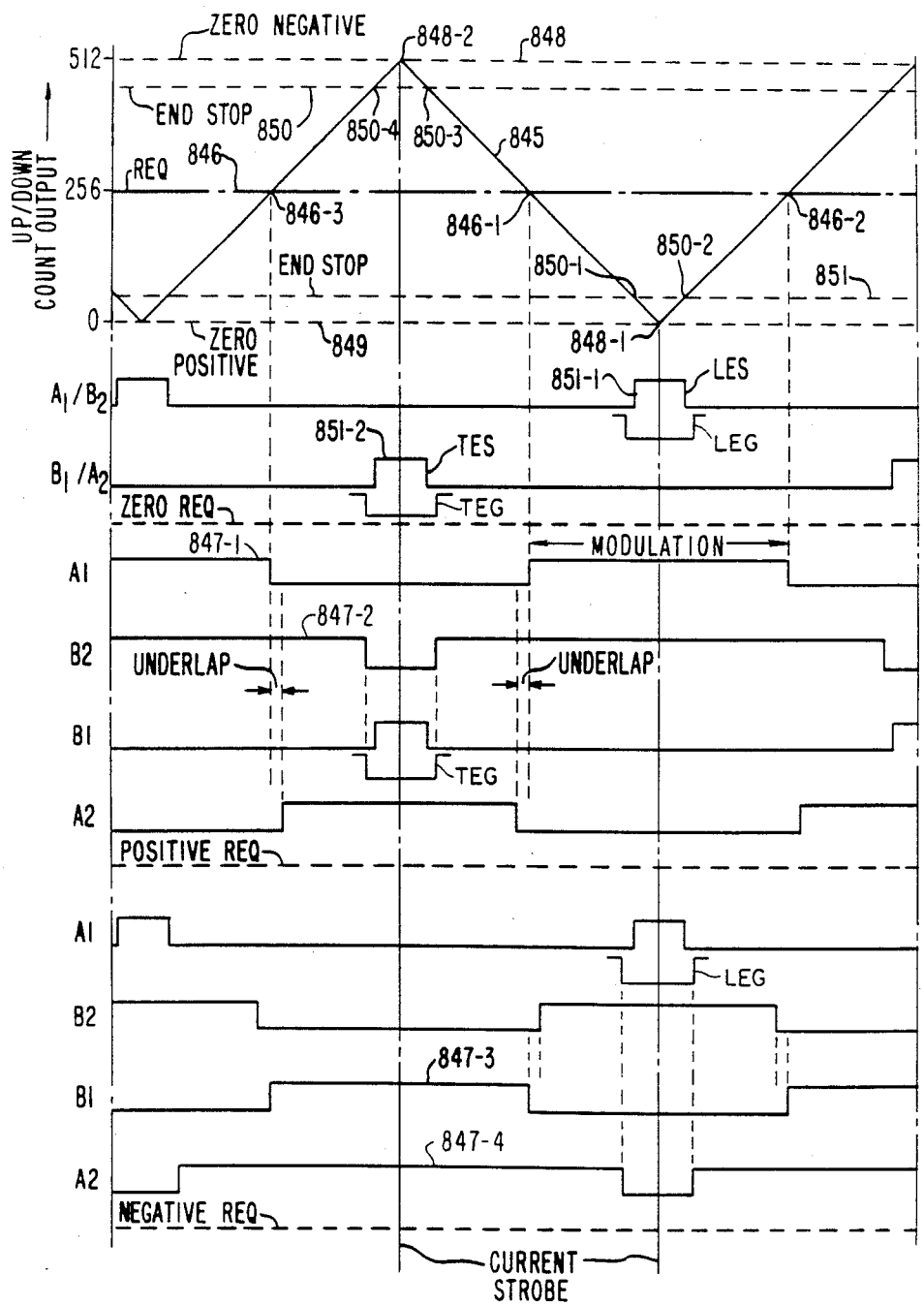
FIG. 8 is a graph which shows control signals generated by the PWM for the power amplifier.

The modulation system used to generate digital switching signals which satisfy axis voltage commands is illustrated in FIG. 8. The up/down counting output of the ramp counter 844 is represented by a saw tooth wave 845 with a top rail 848 (dashed) corresponding to a zero negative motor voltage command with increasing negative voltage commands corresponding to decreasing ordinate values. Bottom rail 849 (dashed) similarly corresponds to a zero positive motor voltage command with increasing positive voltage commands corresponding to increasing ordinate values.

Figure 9A:
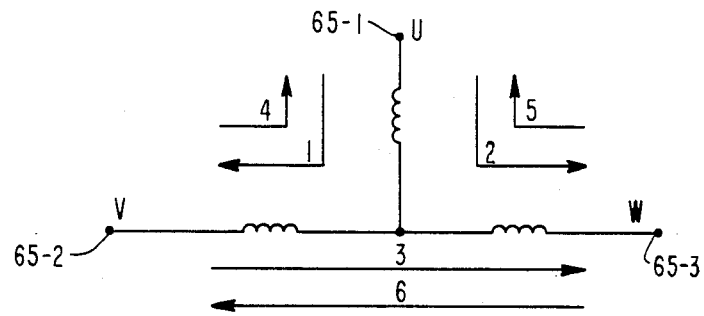
FIGS. 9A–9B show a three phase power amplifier circuit arranged to operate brushless DC motors in accordance with the PWM scheme of the present invention.
Figure 9B:
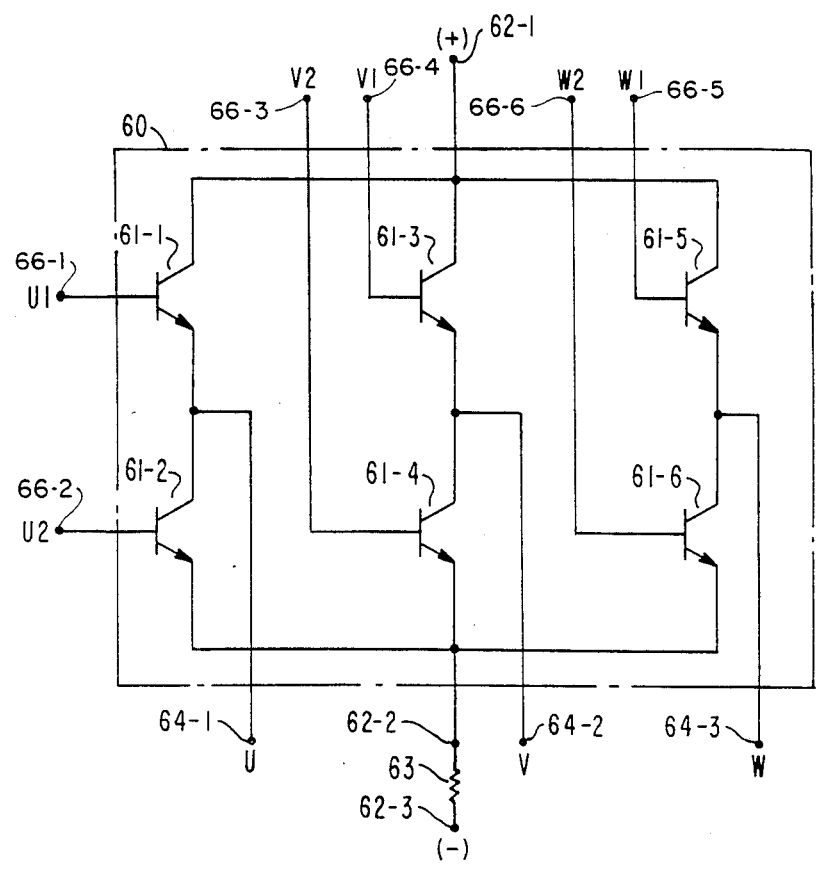
Figure 10:
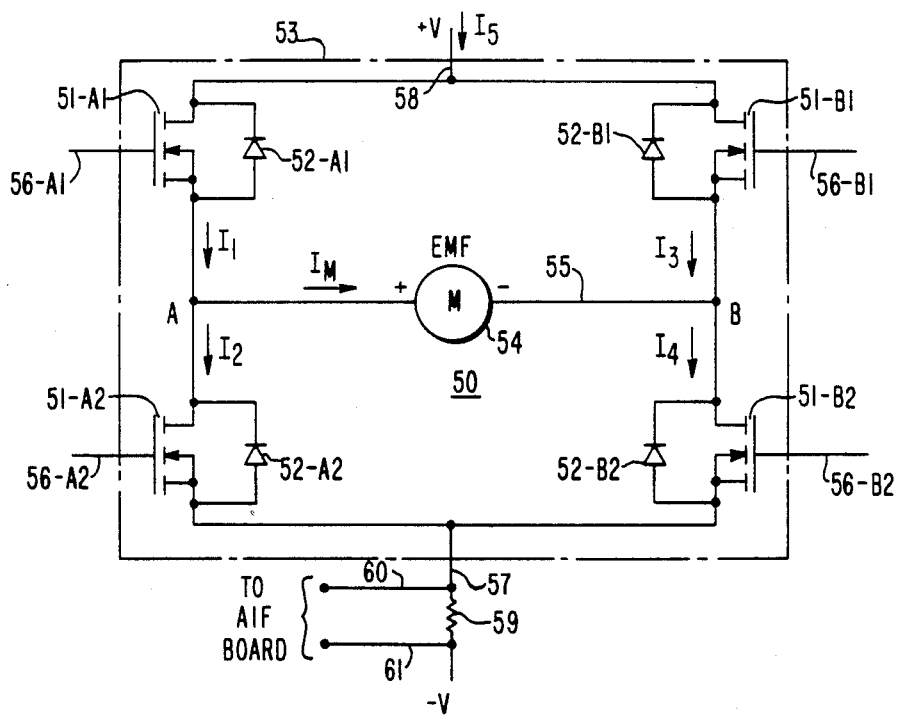
FIG. 10 shows an H bridge power amplifier circuit arranged to operate DC brush type motors in accordance with another embodiment of the PWM scheme of the present invention.

The output control pulses A1, A2, B1, B2 are used to control either the DC brush H bridge type power amplifier of FIG. 10 or, with additional processing circuitry, the DC brushless power amplifier of FIG. 9B. In explaining the operation of the PWM wave the DC brush type embodiment of FIG. 10 will be referenced.

Generally, the width of an output control pulse is logically determined by scaling the voltage request or command (horizontal line 846 corresponding to a counter count of 256) along the ordinate for the counter sawtooth waveform 845 according to the magnitude of the voltage command. In illustrative Case No. 1, positive voltage commands are scaled upward from end point 848-1 and intersect points 846-1 and 846-2 define the width of the resultant A1 control pulse 847-1 needed to execute the commanded positive motor voltage (with B2 enabling pulse 847-2 on as shown). With A1 and B2 on, current flows through the motor in the positive direction to the right in FIG. 10.

In illustrative Case No. 2, negative voltage commands are scaled downward from end point 848-2 and intersect points 846-3 and 846-1 define the width of the resultant B1 control pulse 847-3 needed to execute the commanded negative motor voltage (with A2 enabling pulse 847-4 on as shown). With B1 and A2 on, reverse motor current flows through the motor to the left in FIG. 10.

For a zero voltage command, forced negative and positive end stop control voltages represented by dotted lines 850 and 851 together produce an effective motor voltage of zero. The forced negative and positive end stop control pulses TES, TEG and LES, LEG, respectively, also enable in identification of the polarity and magnitude of motor current and thereby enable motor current to be sensed for feedback control. This permits the use of economy hybrid power packs with a single power amplifier single sense resistor 63 in the brushless DC motor embodiment (see FIG. 9B) or the DC brush type motor embodiment with a sensor resistor 59 (see FIG. 10). Thus, current through the current sense resistor 63 or 9, respectively, is the motor current and, although the resistor current is always in the same direction, the motor current direction (polarity) at any point in time can be determined because of the directing effect of the end stop control pulses on regenerative motor currents.

While current samples can be obtained to provide current amplitude and direction knowledge for each leg of a bridge by using sense circuitry within a power block, for example by using a resistor and associated transmitting circuitry in each bridge leg, the power block cost is then significantly greater since relatively complex circuitry is required. Further, the resolution of some current sensing problems may be extremely difficult at best and practically irresolvable at worst.

With the use of a single sense resistor, it becomes important to determine whether the direction and amplitude of motor current will be known under all operating conditions. For example, in the H type bridge, the motor current can flow in either the forward or reverse direction through the motor while constantly flowing in the same directio through the current sense resistor.

As another example, there are various conditions under which regenerative currents flow through the motor but not through the current sense resistor unless provisions are made in the current sense system to account for the regenerative currents. Thus, if a positive voltage motor command is abruptly dropped to zero, the stored inductive energy in the motor will produce a regenerative current that circulates in a diode loop, such as at 52, respectively, through the power switch-/diode circuitry within the power pack, without passing to the power supply through the current sense resistor, and it will go undetected unless provision is made to assure its detection.

With the use of the described end stop pulses, power switches are always turned on at the ends of each PWM cycle to force any regenerative motor current to flow through the power supply and the current sensor resistor thereby enables motor current detection even if the motor voltage command is then zero. While each end stop pulse exists for a short period of time, it produces a small motor current that persists until the next end stop pulse or control pulse. Similarly, the next end stop pulse produces a small but reverse motor current that persists until the next cycle starts. Thus a small motor ripple current results from successive end stop pulses in the absence of control pulses, but the average value of the ripple current is zero so that it has essentially no effect on the current, position and velocity control of the motor.

Current samples are taken once each PWM cycle so that current feedback signals are made available synchronously with control loop operation. Preferably, current samples are obtained at the midpoint of a preselected one of the two end stop pulses in each PWM cycle so that the sample value is the average motor current value for the PWMcycle during which the sample is taken.

Thus, from a basic control standpoint, there is no need for current samples to be obtained more frequently than once each PWM cycle and for this reason it is preferred that the current sampling frequency rate be equal to the PWM cycle frequency. However, the current sampling rate may occur at a lower rate than the PWM cycle frequency but in this event it must be synchronous with the PWM cycle for accurate control action.

Additionally, the current sampling rate could be set at twice the PWM cycle frequency, i.e., a current sample at each end stop pulse, and the purpose of this arrangement could be to enable a control system equipped with suitable logic to select for control use in each PWM cycle the best of the two current samples in that PWM cycle. For example, under certain operating conditions, noise may make a sample at one end stop less accurate than a sample at the other end stop in a PWM cycle and software logic could be employed to selet one (the best) of the two samples.

Reference is made to patent application W.E. 53,224 for more description of the motor current feedback sensing system.

Circuitry associated with the up/down counter 844 senses the cycle count to initiate power amplifier switching in both the positive end region and the negative end region of the sawtooth counter waveform thereby producing forced motor current at both ends of the counter waveform even if the received motor voltage command is zero (i.e., near and at the maximum positive count and the maximum negative count).

As shown in FIG. 8, intersect points 850-1 and 850-2 define the width LES of the positive A1 end stop control pulse 851-1. Similarly, intersect points 850-3 and 850-4 define the width TES of the negative B1 end stop control pulse 851-2.

Opposite switches in the H bridge power amplifier conduct DC brush type motor current during the limit or end stop portions of the PWM cycle. As already indicated, the conducted motor currents are equal but opposite over the two end stops in each PWM cycle and the effective end stop motor current during each PWM cycle is therefore zero.

The end stop currents are produced regardless of the level of the motor voltage command, and calibration of the up/down counter count to motor voltage level for comparison with command voltage in the comparator 845 takes the end stop currents into account.

End stop switching results from the two ramp end stop control pulses 851-1 (LES and LEG), generated within the PWM device 828 and 829 in FIG. 5B, centered on the lower extremity of the PWM ramp, the center of which represents the positive request modulation midpoint. This extremity is referred to as the loer end stop. Similarly, two ramp end stop control pulses 851-2 (TES and TEG) similarly generated and centered on the upper extremity of the PWM ramp, the center of which represents the negative request modulation midpoint and is referred to as the upper end stop.

Within the lower end stop, one of the end stop pulses LEG forces PWM drive signals B1 and A2 to be nonasserted, and the other end stop pulse LES forces PWM drive signals A1 and B2 to be asserted. Positive current thus flows through the H bridge.

Within the upper end stop, one of the end stop pulses LEG forces PWM drive signals A1 and B2 to be nonasserted, and the other end stop pulse TES forces PWM drive signals B1 and A2 to be asserted. Negative motor current thus flows through the H bridge. The ramp end stop pulses, TES and LES, are made available as device output signals.

Command and status information common to all three axes include an overall PWM enable signal and a PWM ramp cycle interrupt.

Other PWM chip functions common to all three axes primarily involve safety related features including a watchdog timing circuit 839 and an absolute voltage request limiter. The watchdog timer is implemented by counting PWM ramp cycles, and it disables PWM generation if voltage commands fail to be issued to any of the three voltage command registers within the time required for generation of two sample pulses, which equates to four consecutive PWM ramp cycles. Axis runaway conditons are thus prevented in the event of failure of the controlling microprocessor to update voltage commands in a timely manner.

The absolute voltage request limit circuitry is equivalent to an adjustable voltage clamp on each of the drives. The voltage clamp operates independently of the voltage command on a per channel basis. The voltage limit is set by writing to register 0. A single voltage limit value is used for limiting the voltage output for all three axes implemented within the PWM chip. The voltage limiter comprises a holding register for storage of the limit value and a 4-bit comparator. This provides sixteen limit ranges.

Initialization or reset of the PWM chip results in all voltage command registers being set to zero and all PWM drive signals being forced to the nonasserted state. The reset state is maintained until a specific command is issued to the command register by the controlling microprocessor. Once enabled, PWM signals are generated in accordance with the command voltage value for each of the three channels until either a specific command is issued to disable PWM generation or until the watchdog timer timeout expires.

With reference to FIG. 5B, the ramp counter also operates a strobe generator 852 to produce a current sampling signal SAMPL, preferably precisely at each cycle end point 848-1 or 848-2 (i.e. at 4 KHz in the 860 robot). The signal SAMPL triggers a coupling of the sensed feedback current from the power amplifier of FIGS. 9 or 10 withthe current control loop once each PWM cycle (for either a positive or a negative voltage command) in synchronism with the execution of current control loop calculations. As one alternative, the SAMPL frequency may be one half that of the PWM cycle frequency.

Within gate logic circuitry 847 shown in FIG. 5B, polarity detection circuitry determines which drive signals are to be asserted, i.e., which switches in the power amplifier are to be operated to produce the command motor direction. In addition, underlap protection circuitry prevents simultaneous enabling of switches on the same side of the power amplifier H bridge (FIG. 10). For this purpose, a short time gap indicated between dashed vertical line pairs in FIG. 8 is imposed for both switches on the same side of the bridge circuit to be off (i.e., switches which would produce a short across the power supply if they were on simultaneously) so as to allow for switching time.

Initialization of the PWM device results in all voltage command registers being set to zero command and all PWM drive signals being forced to the nonasserted state. This state is maintained until a specific command is issued to the PWM command (subsequently shown to be Register 1 in FIG. 11) by the controlling microprocessor. Once enables, PWM signals are generated in accordance with the command value for each of the three channels until either a specific command is issued to disable PWM generation or until the watch dog timer timeout expires.

The watchdog timer is implemented by counting PWM ramp cycles. The watch dog timer forces PWM generation to be disabled if voltage commands are not issued to any of the three voltage command registers within three consecutive PWM ramp cycles. Runaway conditions are thus prevented from occurring in the arm axes due to failure of the controlling microprocessor to update voltage commands in a timely manner.

Diagnostic capability is also provided by the PWM chip. The up/down counter 844 can be incremented or decremented under control of the microprocessor interface, and the counter contents can be read by the microprocessor interface. This provides assurance that the counter is completely functional before enabling PWM generation.

Command register bit assignments in the PWM chip and the input/output configuration for the chip in FIG. 6A for the PWM-A and PWM-B or 828 and 829, respectively, are set forth in the Appendix.

H Bridge Power Amplifier—DC Brush Type Motors

An H bridge power amplifier or block 50 of the low cost hybrid type is shown in FIG. 10, and one of the power blocks 50 is employed to provide motor drive current for each robot arm joint motor in DC brush type motors.

The power block 50 includes four semiconductor switches 51-A1, 51-A2, 51-B1 and 51-B2. Respective protective back voltage diodes 52-A1, 52-A2 and 52-B1, 52-B2 are connected across the respective semiconductor switches to permit the flow of freewheeling currents when the 51-A1, 51-A2 and 51-B1, 51-B2 turned off.

The switches and diodes are packaged within a block indicated by dotted line 53. As previously indicated, no internal control circuitry is included in the hybrid type power block thereby enabling flexible configuration of external controls.

A robot joint DC brush type motor 54 (representative of any of the joint motors included in the Unimation 700 series robot arm of FIG. 1) is connected in a crosspath 55 of the H bridge circuit. When switches 51-A1 and 51-B2 are turned on, a positive voltage is applied across the motor 54 and current flows to the right in the crosspath 55 to drive the motor in the forward direction. With switches 51-B1 and 51-A2 turned on, current flows through the crosspath 55 in the opposite direction to drive the motor in the reverse direction. The digital pulses A1 and B1 of FIG. 8 precisely control the on time of the switches 51-A1 and 51-B1 respectively so as to produce the motor current needed to satisfy control commands. The pulses A2 and B2 control the on time of the switches 51-A2 and 51-B2 so that the B2 and A2 on times respectively embrace the A1 and B1 on times (thereby providing closed paths for motor drive current during A1, B1 on time and circulating paths for motor freewheeling currents during A1, B1 off times) and so that the A1 and A2 switches are not on at the same time and the B1 and B2 switches are not on at the same time (to avoid shorting the power supply).

The digital pulse pairs A1, B2 and B1, A2 determine the switch on time for forward motor drive current and reverse motor drive current respectively. In turn, the switch on time determines the motor energization level, i.e., the motor torque.

Switch base leads 56-A1, 56-A2 and 56-B1, 56-B2 extend from the switches to the outside of the block 53 where switch drive signals A1, A2, B1 and B2 are coupled from the pulse width modulator. Power supply voltage V is connected across external supply leads 57 and 58 to provide the motor drive current. An external current sensing resistor 59 is connected in series between the lead 57 and the power supply. Conductors 60 and 61 are connected from the two resistor terminals to apply the voltage drop across the current sensing resistor to the current feedback circuitry on the AIF board where it is processed for use in the current or torque control loop.

Power Amplifier Drive Circuitry-Brushless DC Motors

Figure 7A:
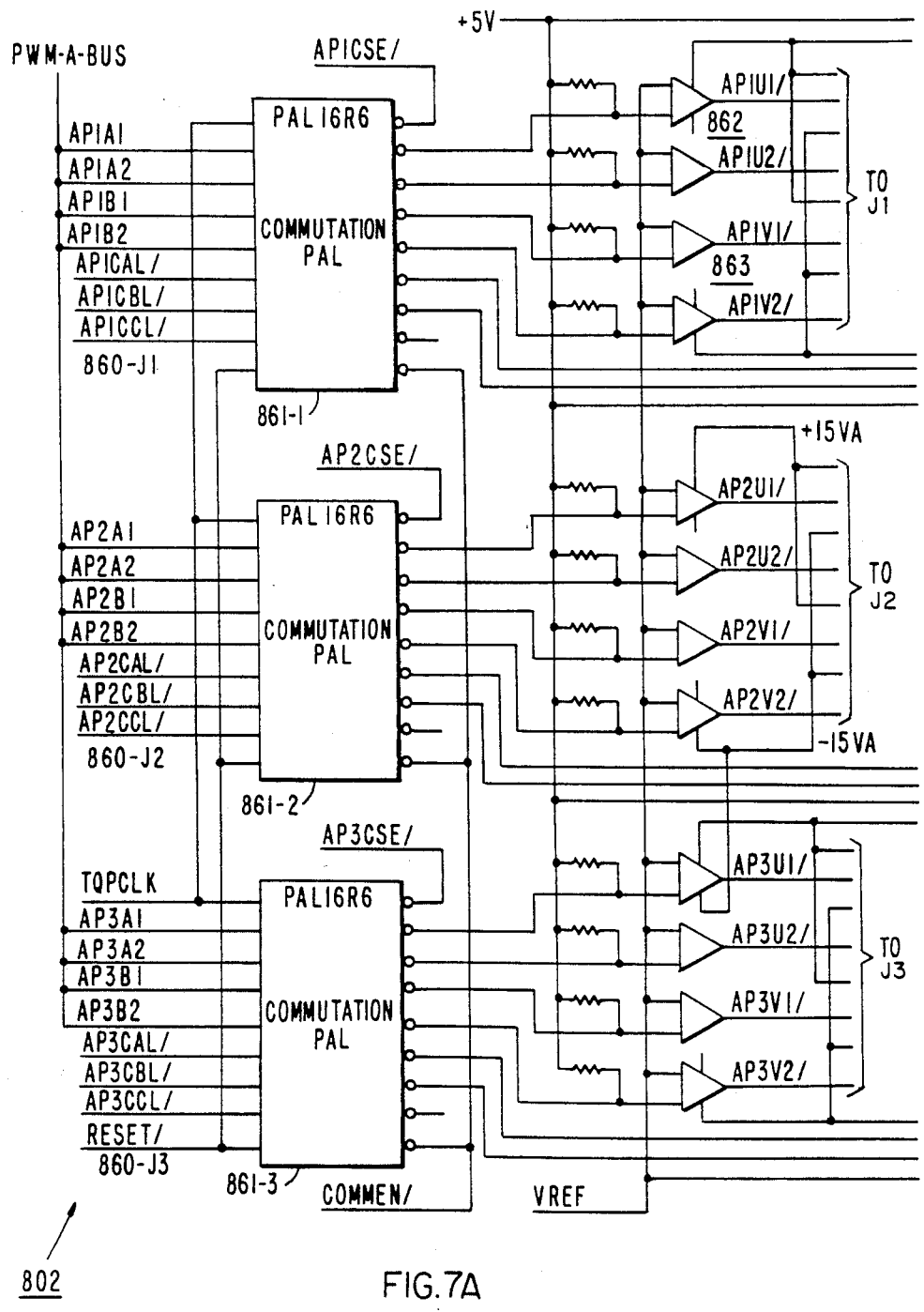
FIGS. 7A–7D show the PWM generator output circuitry in greater schematic detail.
Figure 7B:
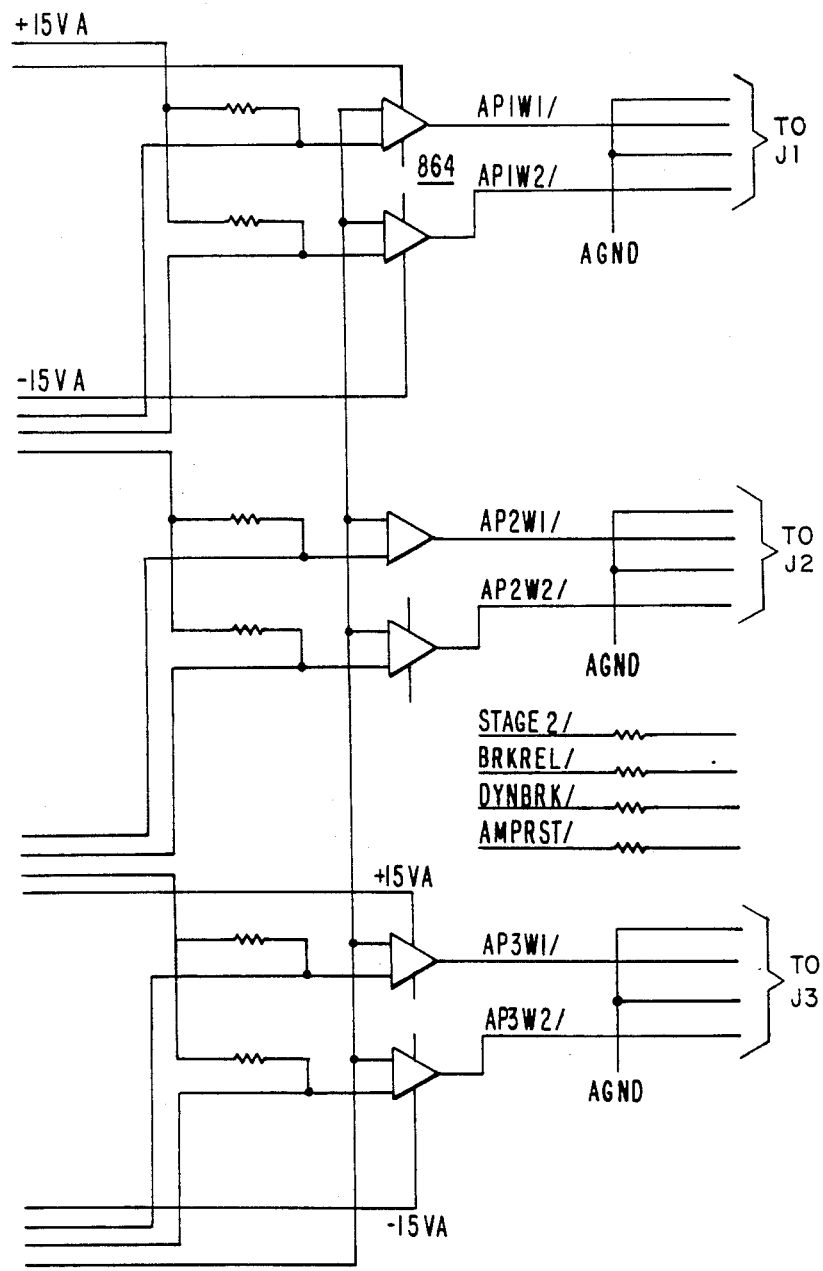
Figure 7C:
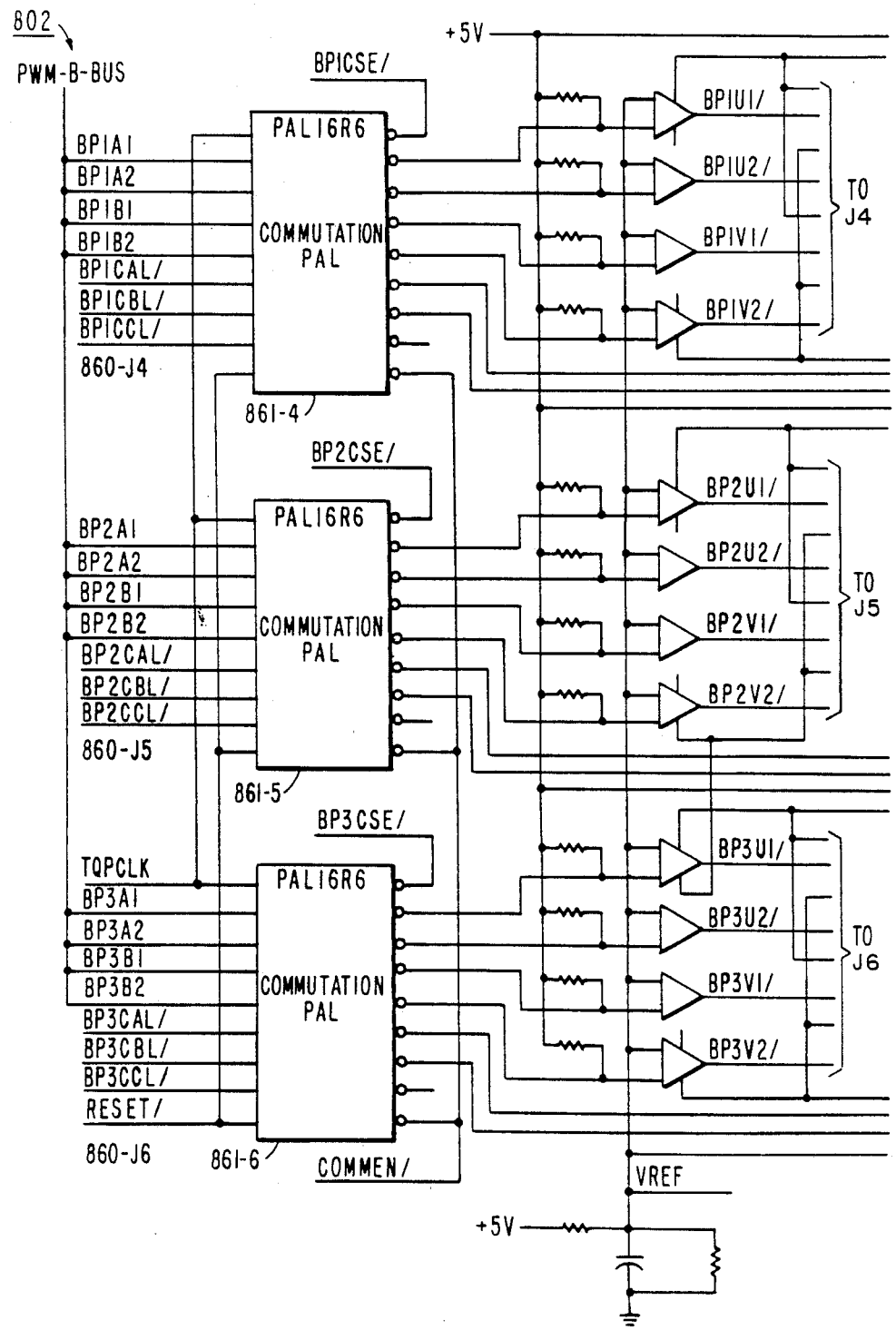
Figure 7D:
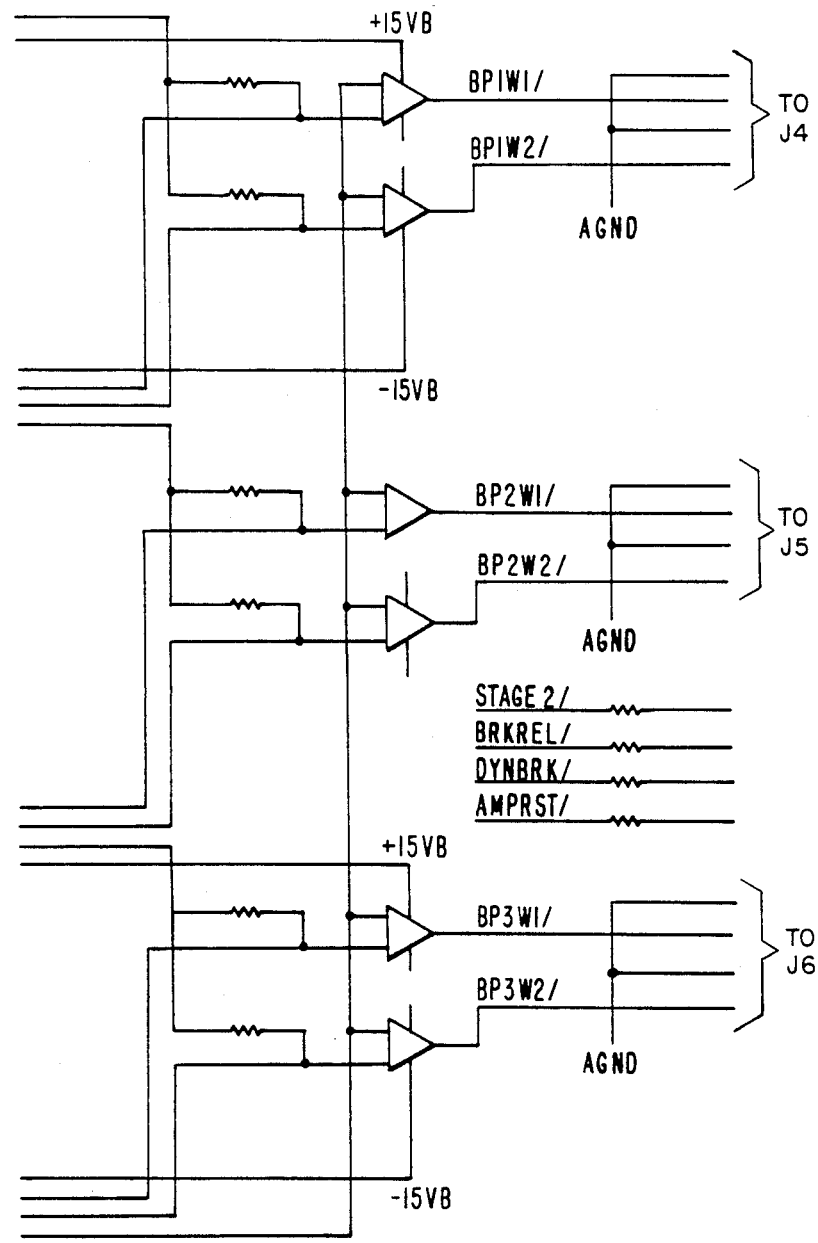

In the brushless DC joint motor embodiment, separate drive circuit channels 860J1-860J6 shown in FIGS. 7A and 7C are provided on the AIF board 800 of FIG. 4 to process and couple the PWM digital outputs to the power amplifiers for respective robot arm DC brushless joint motors. Since the drive circuit channels are alike, only the channel 860J1 will be described.

At the input of the drive circuit channel 860J1, the PWM-A digital drive pulses AP1A1, AP1A2 and AP1B1, AP1B2 are applied to a PAL device 861-1. The A2 and B2 pulses are wideer enable pulses while the A1 and B1 pulses are control pulses contained on the time seal within the A2 and B2 pulses respectively. Greater motor drive current is produced by wider control pulses A1 or B1.

In addition, feedback commutation signals AP1CAL-CBL-CCL from the joint 1 brushless motor are applied to the PAL device 861-1. Three Hall effect sensors 846-1, 865-1, 866-1, shown in FIG. 13F-1 of incorporated by reference U.S. Ser. No. 932,989 are disposed about the periphery of the joint 1 motor to indicate which way the rotor is moving and what the position of the rotor is. Like sensors are employed for each joint motor. Additional signal processing circuitry concerning the Hall effect sensor signals for generating the commutation signals is shown in FIGS. 13F-2 and 13G-2 of the above incorporated by reference U.S. Ser. No. 932,989.

The PAL device 861-1 logically operates driver circuits 862, 863 and 864 shown in FIGS. 7A and 7B to generate commutation timed signal sets APAU1-U2, AP1V1-V2 and AP1W1-W2 for application to the power amplifier switches which in turn direct motor drive current pulses through the joint 1 motor windings in accordance with the commutation control and in accordance with the pulse width modulation control. The currents through the windings of the other joint motors are similarly controlled by the other PAL devices 861.

Brushless DC Motors

In FIG. 9A, there is shown the stator winding circuitry for DC brushless motors employed as axis drives in various robots including the Unimation 860 robot which is more powerful than the Unimation 700 Series robot shown in FIG. 1.

Power switch circuitry for the windings is shown in FIG. 9B. The switches are operated to direct current through two of the three windings at any one point in time, and the winding connection switching is rotated about the windings under PAL control. The effective magnitude of the motor current depends on the switch ON time which in turn is controlled by the PWM output.

Power Amplifier for Brushless DC Motors

A commercially available, low cost hybrid power amplifier block 60 (FIG. 9B) is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching circuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation as more fully disclosed in cross-referenced patent application U.S. Ser. No. 180719.

The power amplifier block 60 additionally includes external terminals 64-1, 64-2 and 64-3 for respective connection to the free ends 65-1, 65-2 and 65-3 of the Y connected motor windings. External terminals 66-1 through 66-5 are also provided for application of the switch control signals U1 and U2, V1 and V2 and W1 and W2 from the PWM commutation circuitry. To prevent power supply shorting and switch burnout, the power switches are always controlled so that only one switch can be on at a time in each of the respective pairs of switches 61-1 and 61-2, 61-3 and 61-4 and 61-5 and 61-6.

The control signals U1, V1 and W1 are the basic pulse width control signals that control the level of drive current through the motor windings. The control signals U2, V2, and W2 enable the six motor winding conduction paths in rotation and generally provide for the flow of freewheeling motor currents. Reference is made to U.S. Ser. No. 178813 for a more complete description of the brushless motor embodiment.

APPENDIX

Command Register Write Bit Assignments (FIG. 11)

Command Bit 7: This bit provides the capability for software control of overall PWM generation. Writing this bit to a "1" enables PWM generation. Writing this bit to a "0" disables PWM generation.

Command Bit 6: This bit provides the capability for software control of the PWM ramp clock, provided PWM generation is disabled. This bit being in the logical "0" state selects command bit 5 as the source for the PWM ramp counter clock. This bit being in the logical "1" state selects the external clock as the source for the PWM ramp counter clock. Enabling PWM generation forces selection of the external clock.

Command Bit 5: This bit provides the capability for software clocking of the PWM ramp counter. The PWM ramp counter will be clocked upon transition of this bit to the logical "1" state provided command bits 6 and 7 are in the logical "0" state.

Command Bit 4: Not implemented.

Command bits 3 through 0: These command bits provide input to a voltage request limiter register. This limiter acts as an absolute clamp for all voltage request registers.

Command Register Read Bit Assignments (FIGS. 3-5B and 11)

Status Bit 7: This bit reflects the present PWM generation status. This bit being at a logical "1" indicates that PWM generation is enabled. This bit being at a logical "0" indicates that PWM generation is disabled. PWM generation can be disabled either by setting the command bit 7 to the logical "0" state or by expiration of the internal watchdog timer. The state of this bit directly determines the state of the PWM enable external status signal, device pin 33.

Status Bit 6: This bit reflects the device interrupt request status. This bit being in the logical "0" state indicates no interrupt request is present, and this bit being in the logical "1" state indicates that an interrupt request is pending. Device pin 35, Interrupt Pin reflects the inverted state of this bit. This combination, external signal pin and internal status bit, permits operation of the device in either polled or interrupt driven applications. This bit is set to the logical "1" state by current sample pulse generation, and is reset by writing to any of the device voltage request registers.

Status Bit 5: This bit provides an interrupt overrun status indicator. This bit is set to the logical "1" state by expiration of the internal watchdog timer. Once set, PWM generation will be disabled, and the device must be re-initialized to reset the bit and enable PWM generation.

Status Bit 4: Not implemented, always read as a logical "0".

Status Bits 3 through 0: These status bits directly reflect the value written to the voltage request limit register, command bits 3 through 0.

| INPUT/OUTPUT SIGNALS FOR PWM-A & B | | | |
|---|---|---|---|
| Symbol | Pin No. | Type | Name and Function |
| A2-A0 | 3-1 | I | Address: Used to select one of the seven internal registers for read or write operations. |
| D7-D0 | 14-8 | I/O | Data: Bi-directional, three state, data bus signal lines. D7 represents the most significant bit. |
| DX | 15 | I | Data: Bi-directional, three state, data bus signal line. Represents least significant bit of voltage reference commands. |
| DOPT | 16 | I | Data Bus Option: Hardwired signal input used to specify system data bus width. Connected to ground for 16-bit data bus. Microprocessor must use word operations for interchange with the device. This requires D7 be connected to the data bus most significant bit. Connected to +5v for 8-bit data bus. |
| CSb | 4 | I | Chip Select: Low asserted input used to indicate that the device is being selected for information interchange. |
| WRb | 5 | I | Write: Read/Write control input. |

Used to specify the transfer direction for information interchange. Low asserted for write operations.

| Symbol | Pin No. | Type | Name and Function |
|---|---|---|---|
| DSb | 6 | I | Data Strobe: Low asserted signal input used to indicate that the device is to either accept or apply data to the data bus. |
| DTACKb | 7 | O | Data Transfer Acknowledge: Open collector, low asserted output used to indicate that the transfer can be terminated. |
| Rb | 19 | I | Reset: Low asserted input used to initialize all device internal registers. |
| P1A1 | 21 | O | Axis 1, A Side, Upper Drive: High asserted output used to control the upper device on the A side of an "H" bridge. |
| P1A2 | 22 | O | Axis 1, A Side, Lower Drive: High asserted output used to control the lower device on the A side of an "H" bridge. |
| P1B1 | 23 | O | Axis 2, B Side, Upper Drive: High asserted output used to control the upper device on the B side of an "H" bridge. |
| P1B2 | 24 | O | Axis 1, B Side, Lower Drive: High asserted output used to control the lower device on the B side of an "H" bridge. |
| P2A1 | 25 | O | Axis 2, A Side, Upper Drive: High asserted output used to control the upper device on the A side of an "H" bridge. |
| P2A2 | 26 | O | Axis 2, A Side, Lower Drive: High asserted output used to control the lower device on the A side of an "H" bridge. |
| P2B1 | 27 | O | Axis 2, B Side, Upper Drive: High asserted output used to control the upper device on the B side of an "H" bridge. |
| P2B2 | 28 | O | Axis 2, B Side, Lower Drive: High asserted output used to control the lower device on the B side of an "H" bridge. |
| P3A1 | 29 | O | Axis 3, A Side, Upper Drive: High asserted output used to control the upper device on the A side of an "H" bridge. |
| P3A2 | 30 | O | Axis 3, A Side, Lower Drive: High asserted output used to control the lower device on the A side of an "H" bridge. |
| P3B1 | 31 | O | Axis 3, B Side, Upper Drive: High asserted output used to control the upper device on the B side of an "H" bridge. |
| P3B2 | 32 | O | Axis 3, B Side, Lower Drive: High asserted output used to control the lower device on the B side of an "H" bridge. |
| ENP | 33 | O | PWM Enabled: High asserted signal output which provides external indication that PWM generation is enabled. |
| TES | 18 | O | Top End Stop: High asserted signal output which provides external indication that the PWM ramp is within the upper end stop ramp region with B side upper drive and A side lower drive devices on. |
| LES | 36 | O | Low End Stop: High asserted signal output which provides external indication that the PWM ramp is within the lower end stop ramp region with A side upper drive and B side lower drive devices on. |
| SAMPb | 34 | O | Sample: Low asserted current sample strobe signal. This signal has the same ramp time relationship as LES; however, SAMPb is only asserted every |

-continued

| INPUT/OUTPUT SIGNALS FOR PWM-A & B | | | |
|---|---|---|---|
| OCSF | 38 | I | Oscillator In: External clock input or crystal connection. other ramp time. |
| OSC | 39 | O | Oscillator Out: External crystal drive signal. |
| COUTb | 37 | O | Clock Out: Inverted, buffered clock signal. |
| GND | 20 | | Ground: Power supply return pin. |
| VCC | 40 | | Power: +5 volt power supply pin. |

What is claimed is:

1. A digital pulse width modulator circuit for operating power amplifiers and joint motors during positive, negative and non-forcing motor drive requests by measuring the motor current in an associated sense resistor for each joint motor in a robot control comprising:
   up/down counter means for generating a sawtooth waveform, having positive and negative apexes adapted for timing the current measurement within a control pulse interval, by counting up to and down from an upper endpoint to a lower endpoint as a function of time;
   means for comparing the count of the counter means for the sawtooth waveform to a signal representing a control command so as to define a time span needed to operate a power amplifier and energize an associated joint drive motor in accordance with the control command;
   means for generating a first output control pulse for power amplifier switching when one drive polarity is commanded, said first output control pulse having a width corresponding to the defined time span and based on a count comparison referenced to the upper endpoint of the sawtooth waveform; and
   means for generating a second output control pulse for power amplifier switching when the other polarity is commanded, said second output control pulse having a width corresponding to the defined time span and based on a count comparison referenced to the lower endpoint of the sawtooth waveform.

2. A digital pulse width modulator circuit as set forth in claim 1 wherein:
   means are provided for generating an end stop output control pulse for a short period of time centered on the upper waveform endpoint and another end stop output control pulse for an equal short period of time centered on the lower waveform endpoint.

3. A digital pulse width modulator circuit as set forth in claim 2 wherein:
   means are provided for generating a third output control pulse corresponding to said one command polarity and generally being on when said second output control pulse is off so as to provide for circulation of regenerative motor currents through the power amplifier; and
   means are provided for generating a fourth output control pulse corresponding to said other command polarity and generally being on when said first output control pulse is off so as to provide for circulation of regenerative motor currents through the power amplifier.

4. A digital pulse width modulator circuit as set forth in claim 3 wherein:
   underlap control means are provided to maintain a minimum off time between said first and fourth output control pulses and between said second and third output control pulses so as to allow for switching time of switching devices controlled by such output control pulses.

5. A digital pulse width modulator circuit as set forth in claim 1 wherein:
   watchdog timer means are included to count a number of consecutive counter cycles over which no command update is received and to signal a shutdown if the number of such cycles reaches a predetermined value.

6. A digital pulse width modulator circuit as set forth in claim 1 wherein a large scale integrated gate array chip is employed to embody the circuit.

7. A digital pulse width modulator circuit as set forth in claim 2 wherein a large scale integrated gate array chip is employed to embody the circuit.

8. A digital pulse width modulator circuit as set forth in claim 4 wherein a large scale integrated gate array chip is employed to embody the circuit.

9. A digital pulse width modulator circuit as set forth in claim 5 wherein a large scale integrated gate array chip is employed to embody the circuit.

10. A digital pulse width generator as set forth in claim 7 wherein three sets of said comparing means and said generating means are provided within said chip to provide three channels for controlling three respective motors associated with three respective axes of said robot.

11. A digital control for a robot having a plurality of arm joints, said control comprising:
   an electronic motor for driving each of the robot arm joints;
   a power amplifier for each of said motors having power switching devices operable by sensing the current in an external sense resistor for each motor and power amplifier pair, to supply current to the motor for forward, non-forcing and reverse operation;
   a digital pulse width modulator circuit for operating the power amplifier switching devices for each aarm joint;
   said modulator circuit including up/down counter means for generating a sawtooth waveform, and congruently imposing a time interval centered on an apex of said sawtooth waveform defining a control pulse width for a current sensing measurement, by counting up to and down from predetermined endpoints as a function of time;
   means for comparing the count of the counter means for the sawtooth waveform to a signal representing a control command so as to define a time span needed to operate a power amplifier and energize an associated joint drive motor in accordance with the control command;
   means for generating a first output control pulse for power amplifier switching when one drive polarity is commanded, said first output control pulse having a width corresponding to the defined time span and based on a count comparison referenced to the upper endpoint of the sawtooth waveform; and
   means for generating a second output control pulse for power amplifier switching when the other polarity is commanded, said second output control pulse having a width corresponding to the defined time span and based on a count comparison referenced to the lower endpoint of the sawtooth waveform; and feedback control loop means for each arm joint and including at least digital position, velocity and current control loops looping through and operating the associated pulse width modulator circuit.

12. A digital robot control as set forth in claim 11 wherein:

each motor is a brush type DC motor;

each power amplifier is an H bridge amplifier circuit having a power switching device in each bridge leg and having the associated DC motor connected in a path joining across and central to the bridge legs;

said first and second output control pulses are coupled to first and second switching devices in the bridge legs on first and second sides of the bridge; and said digital pulse width modulator circuit further includes means for generating third and fourth output control pulses corresponding respectively to said one and said other command polarities and generally being on respectively when said second output or said first control pulse is off so as to provide for circulation of regenerative motor currents through the power amplifier; and said third pulse is coupled to a switching device in the other bridge leg on the first bridge side and said fourth pulse is coupled to a switching device in the other bridge leg on the second bridge side.

13. A digital robot control as set forth in claim 11 wherein:

each motor is a brushless type DC motor having three interconnected phase windings; and each power amplifier includes six power switching devices interconnected between a power supply and the associated motor windings to energize said motor windings under control of said pulse width modulator circuit.

14. A digital robot control as set forth in claim 11 wherein:

means are provided for generating an end stop output control pulse for a short period of time centered on the upper waveform endpoint and another end stop output control pulse for an equal short period of time centered on the lower waveform endpoint.

15. A digital control as set forth in claim 12 wherein:

underlap control means are provided to maintain a minimum off time between said first and fourth output control pulses and between said second and third output control pulses so as to allow for switching time of switching devices controlled by such output control pulses.

16. A robot having:

an arm with a plurality of joints;

each of said joints having an electric drive motor associated therewith;

a power amplifier for operating each of said motors by sampling the motor current in a sense resistor remotely sensitive to each associated said motor;

digital pulse width modulator circuit means for operating each power amplifier;

each pulse width modulator circuit means including up/down counter means for generating a sawtooth waveform by counting to upper and lower endpoints, each endpoint is adapted to be symmetrically straddled by respective upper and lower control pulse intervals for defining a sensing interval for sampling motor current as a function of time;

means for comparing the counter means count for the sawtooth waveform to a signal representing a control command so as to define a time span needed to operate a power amplifier and energize an associated joint drive motor in accordance with the control command;

means for generating a first output control pulse for power amplifier switching when one drive polarity is commanded, said first output control pulse having a width corresponding to the defined time span and based on a count comparison referenced to the upper endpoint of the sawtooth waveform; and control loop means for each arm joint and including at least digital position, velocity and current control loops looping through and operating the associated pulse width modulator circuit.

17. A robot as set forth in claim 16 wherein:

means are provided for generating an end stop output control pulse for a short period of time centered on the upper waveform endpoint and another end stop output control pulse for an equal short period of time centered on the lower waveform endpoint.

18. A robot as set forth in claim 16 wherein:

means are provided for generating a third output control pulse corresponding to said one command polarity and generally being on when said second output control pulse is off so as to provide for circulation of regenerative motor currents through the power amplifier; and means are provided for generating a fourth output control pulse corresponding to said other command polarity and generally being on when said first output control pulse is off so as to provide for circulation of regenerative motor currents through the power amplifier.

19. A robot as set forth in claim 18 wherein:

underlap control means are provided to maintain a minimum off time between said first and fourth output control pulses and between said second and third output control pulses so as to allow for switching time of switching devices controlled by such output control pulses.

20. A system for energizing and controlling a robot arm joint motor comprising:

at least one winding for said motor;

a power amplifier for energizing said motor winding;

said power amplifier having first switching means for energizing said motor winding in the forward direction and second switching means for energizing said motor winding in the reverse direction and a sense resistor responsive to the current in both of said motor winding directions;

a digital pulse width modulator circuit having up/down counter means for generating a counting period as a function of time;

means for comparing the counter means counting period to a signal representing a control command so as to define a time width of at least a first output control pulse for operating said first switching means and a time width of at least a second output control pulse for operating said second switching means according to the control command magnitude and a command polarity; and means for generating respective signals for operating said first and second switching means to force current to be conducted through said motor winding in each direction for a short period of time stationed at the count extremities, in each cycle of said counter.

21. A system as set forth in claim 20 wherein:
said counter means generates a counting period corresponding to substantially a cycle width of a sawtooth waveform; and
said forced current signals are end stop signals generated over equal time spans at and centered on so as to be equally timed from the respective apexes of the upper and lower endpoints of the sawtooth waveform in each counter cycle.

22. A system as set forth in claim 21 wherein:
means are provided for generating a strobe signal at least once each counter cycle at one of the waveform endpoints.

23. A system as set forth in claim 20 wherein:
watchdog timer means are included to count the number of consecutive counter cycles over which no command update is received and to signal a shutdown if the number of such cycles reaches a predetermined value.

24. A digital pulse width modulator circuit for operating power amplifiers and joint motors during positive and negative drive polarity as well as non-forcing request commands, by measuring the motor current during a sensing interval in an associated sense resistor for each joint motor in a robot control comprising:
up/down counter means for generating a sawtooth waveform, having positive and negative apexes adapted for control pulse positioning for defining the sensing interval in which to measure the current from each joint motor through said associated sense resistor, by counting up to and down from an upper endpoint to a lower endpoint as a function of time;
means for comparing the count of the counter means for the sawtooth waveform to a signal representing a control command so as to define a time span needed to operate a power amplifier and energize an associated joint drive motor in accordance with the control command request and for sampling the motor current in the sense resistor at a point in time midway between the beginning and end of the control pulse sensing intervals, the current sampling time occurring only at the apexes of said sawtooth waveform having one predefined polarity;
means for generating a first output control pulse for power amplifier switching when one drive polarity is commanded, said first output control pulse having a width corresponding to the defined time span and based on a count comparison referenced to the upper endpoint of the sawtooth waveform; and
means for generating a second output control pulse for power amplifier switching when the other polarity is commanded, said second output control pulse having a width corresponding to the defined time span and based on a count comparison referenced to the lower endpoint of the sawtooth waveform, said pulse width modulator circuit thereby measuring the motor current synchronously to control said robot, including at those times when the motor is regenerating while a non-forcing command is requested.

* * * * *